(12) United States Patent
Bilbao De Mendizabal

(10) Patent No.: US 11,579,031 B2
(45) Date of Patent: Feb. 14, 2023

(54) SENSOR STRUCTURE FOR MEASURING TORQUE

(71) Applicant: Melexis Technologies SA, Bevaix (CH)

(72) Inventor: Javier Bilbao De Mendizabal, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 99 days.

(21) Appl. No.: 17/149,219

(22) Filed: Jan. 14, 2021

(65) Prior Publication Data

US 2021/0223125 A1 Jul. 22, 2021

(30) Foreign Application Priority Data

Jan. 20, 2020 (EP) .................................. 20152762

(51) Int. Cl.
*G01L 3/10* (2006.01)
*B62D 6/10* (2006.01)
*G01L 5/22* (2006.01)

(52) U.S. Cl.
CPC .............. *G01L 3/104* (2013.01); *B62D 6/10* (2013.01); *G01L 5/221* (2013.01)

(58) Field of Classification Search
CPC . G01L 3/00; G01L 3/101; G01L 3/104; G01L 5/221; B62D 6/10
USPC ...................................... 73/862.331–862.338
See application file for complete search history.

(56) References Cited

U.S. PATENT DOCUMENTS

| | | | |
|---|---|---|---|
| 2002/0189371 A1 | 12/2002 | Nakane et al. | |
| 2010/0005909 A1 | 1/2010 | Antoni et al. | |
| 2013/0298698 A1 | 11/2013 | Elliott | |
| 2016/0138983 A1* | 5/2016 | Ikeda ...................... | B62D 6/10 |
| | | | 73/862.193 |
| 2018/0180497 A1* | 6/2018 | Nishiguchi ............. | G01L 5/221 |
| 2018/0339729 A1* | 11/2018 | Berner ............... | B62D 15/0215 |

FOREIGN PATENT DOCUMENTS

| | | | | |
|---|---|---|---|---|
| CN | 101523176 | * | 9/2009 | |
| CN | 105270467 A | * | 1/2016 | ............. G01L 3/101 |
| DE | 102007057050 A1 | | 7/2008 | |
| DE | 102015122179 A1 | | 6/2017 | |

(Continued)

OTHER PUBLICATIONS

Search Report from corresponding EP Application No. EP20152762. 9, dated Jul. 14, 2020.

*Primary Examiner* — Octavia Davis Hollington
(74) *Attorney, Agent, or Firm* — Workman Nydegger

(57) ABSTRACT

A sensor structure for measuring a torque applied to a first shaft and a second shaft interconnected by a torsion bar, includes: a multi-pole ring magnet mechanically connected to the first shaft; two pairs of magnetic yokes mechanically connected to the second shaft, each yoke being connected to one or more pads by fingers; the fingers of the first pair of yokes projecting mainly in a radial direction, the fingers of the second pair of yokes projecting mainly in an axial direction; a first and a second pair of flux collectors with extensions forming a first and a second gap; a first sensor in the first gap, a second sensor in the second gap; a circuit for combining signals from the first and second sensor to reduce or eliminates the influence of an external disturbance field, and for determining the torque value.

20 Claims, 14 Drawing Sheets

(56) References Cited

FOREIGN PATENT DOCUMENTS

| | | | | |
|---|---|---|---|---|
| EP | 2072985 | A1 | 6/2009 | |
| EP | 3505894 | A1 | 7/2019 | |
| EP | 3754356 | A1 * | 12/2020 | ............... G01B 7/30 |
| JP | 2010243399 | A * | 10/2010 | |
| JP | 2012251814 | A * | 12/2012 | |
| JP | 2017083178 | A * | 5/2017 | |
| JP | 2018132509 | * | 8/2018 | |
| JP | 6670230 | B2 * | 3/2020 | ............... B62D 6/10 |
| WO | WO-2011048846 | A1 * | 4/2011 | ............. G01L 3/104 |

* cited by examiner

FIG. 1(a)
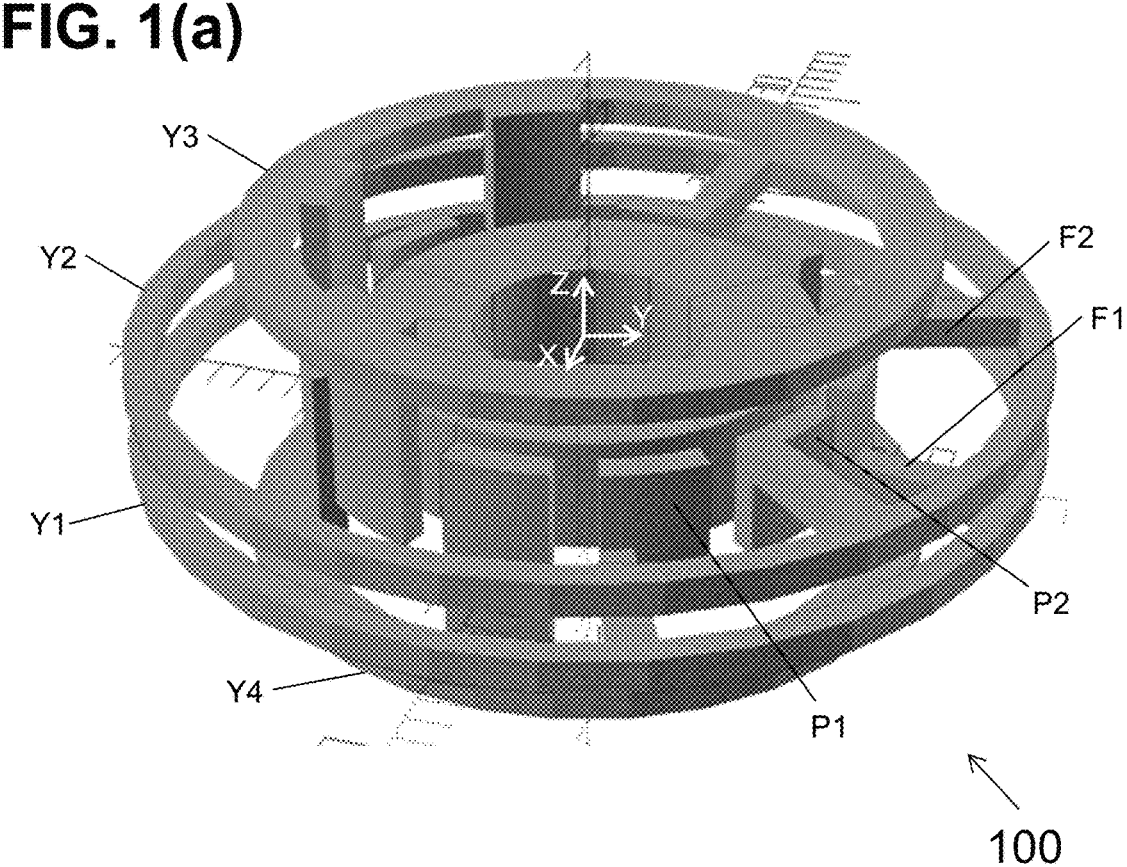
FIG. 1(b)
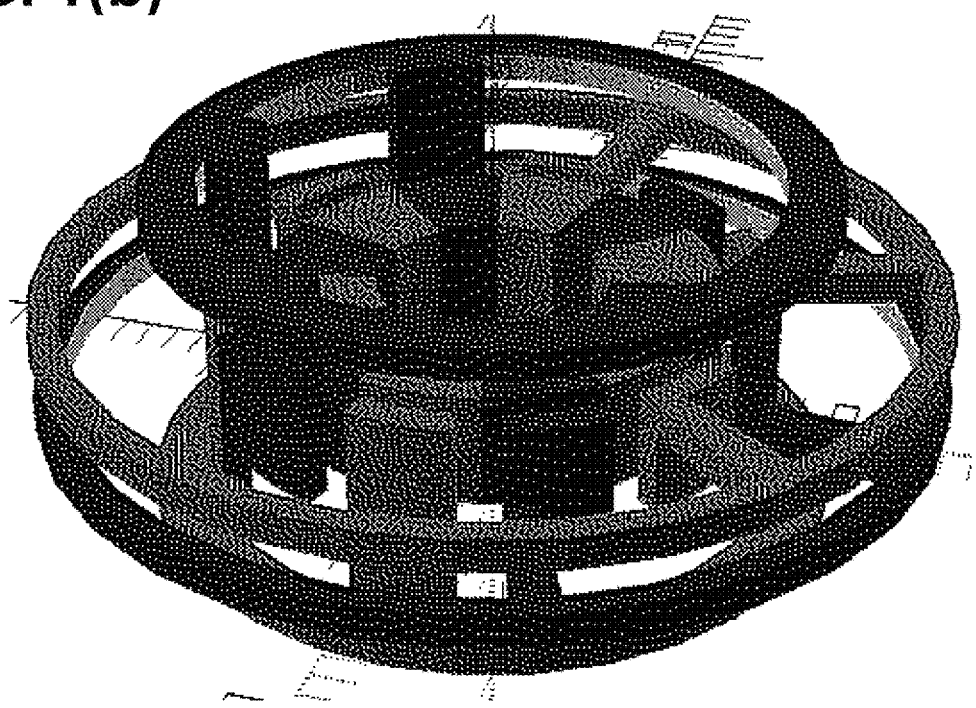
FIG. 1

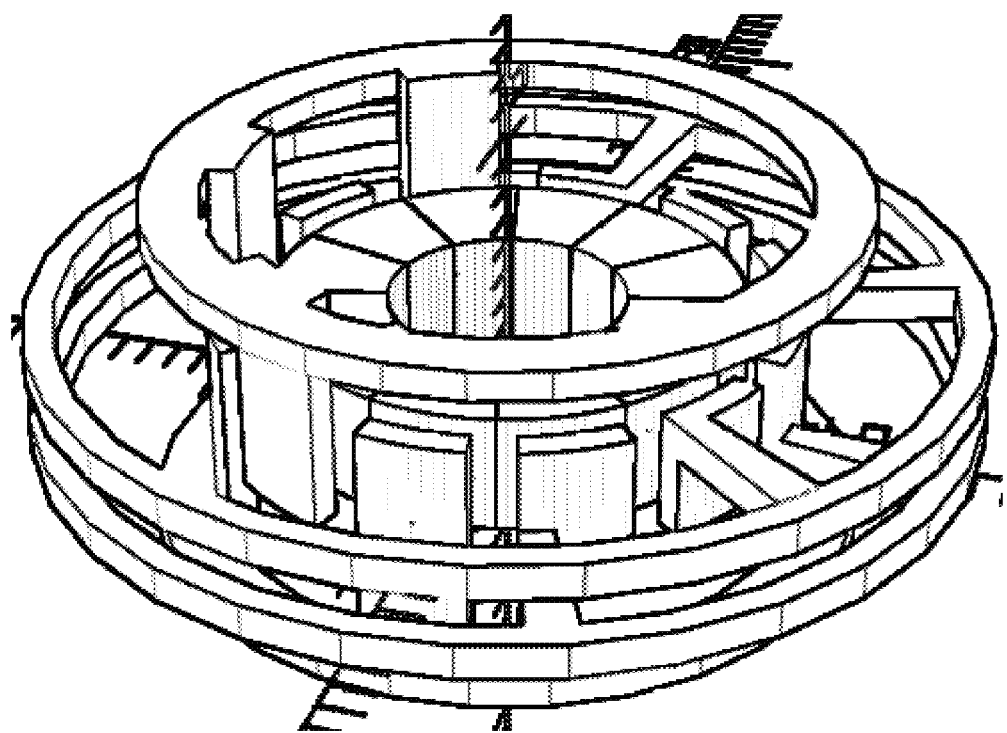
FIG. 1(c)
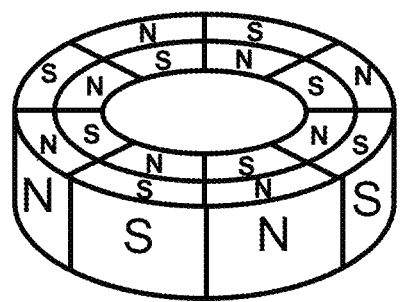
FIG. 1(d)
FIG. 1

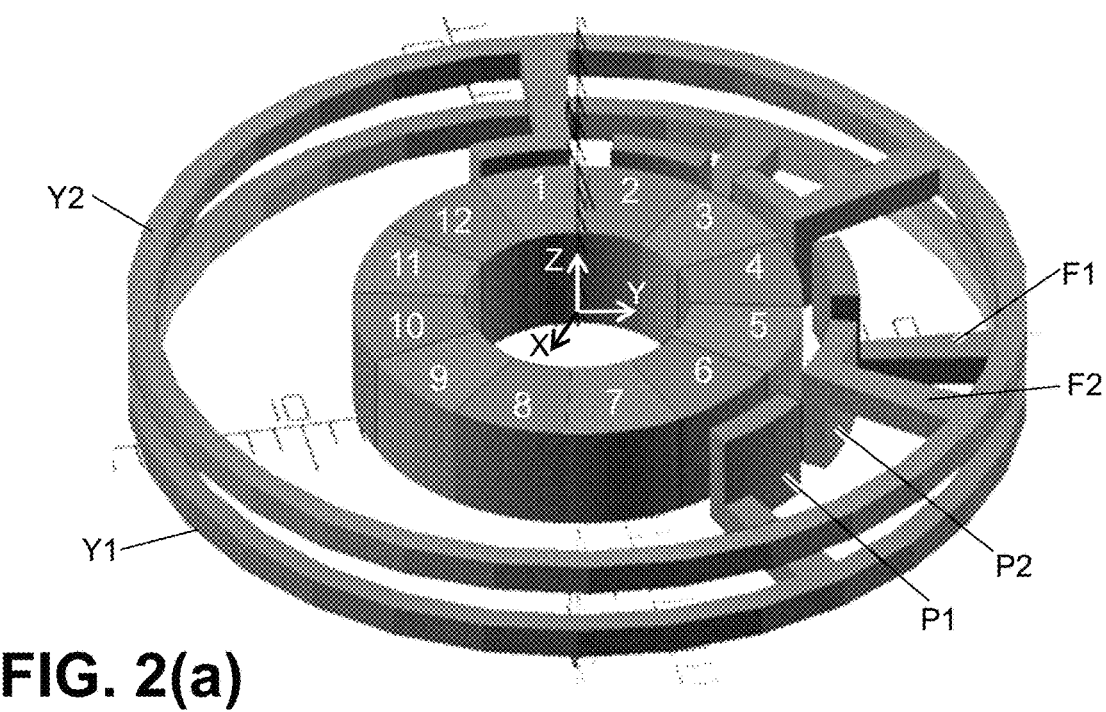
FIG. 2(a)
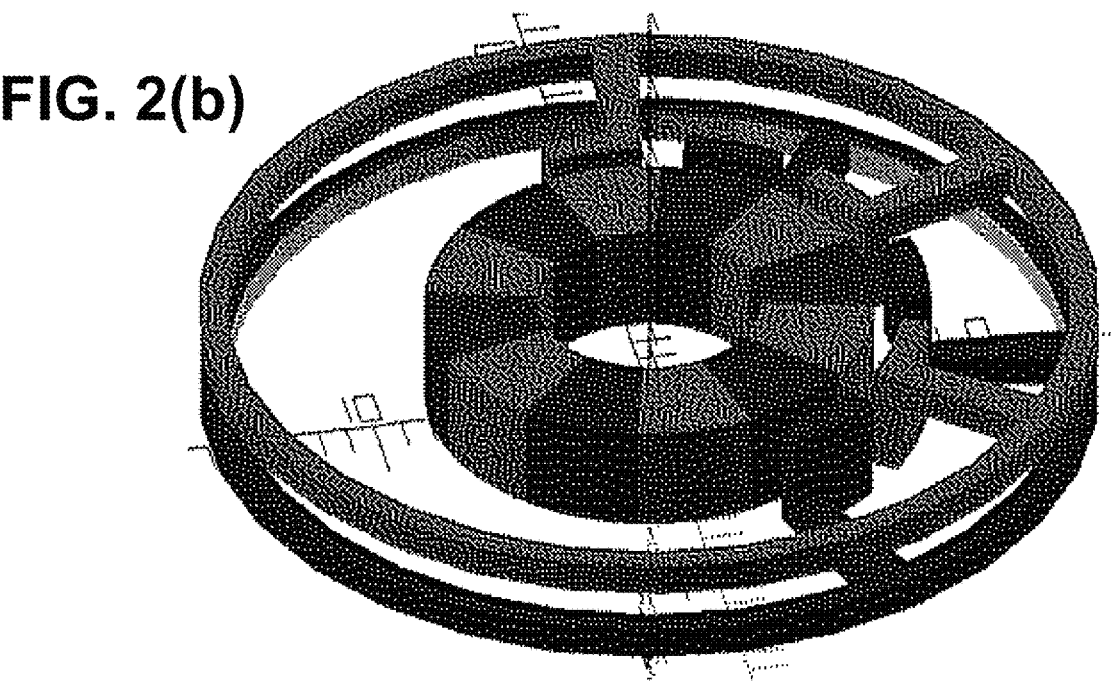
FIG. 2(b)
FIG. 2

FIG. 3(a)
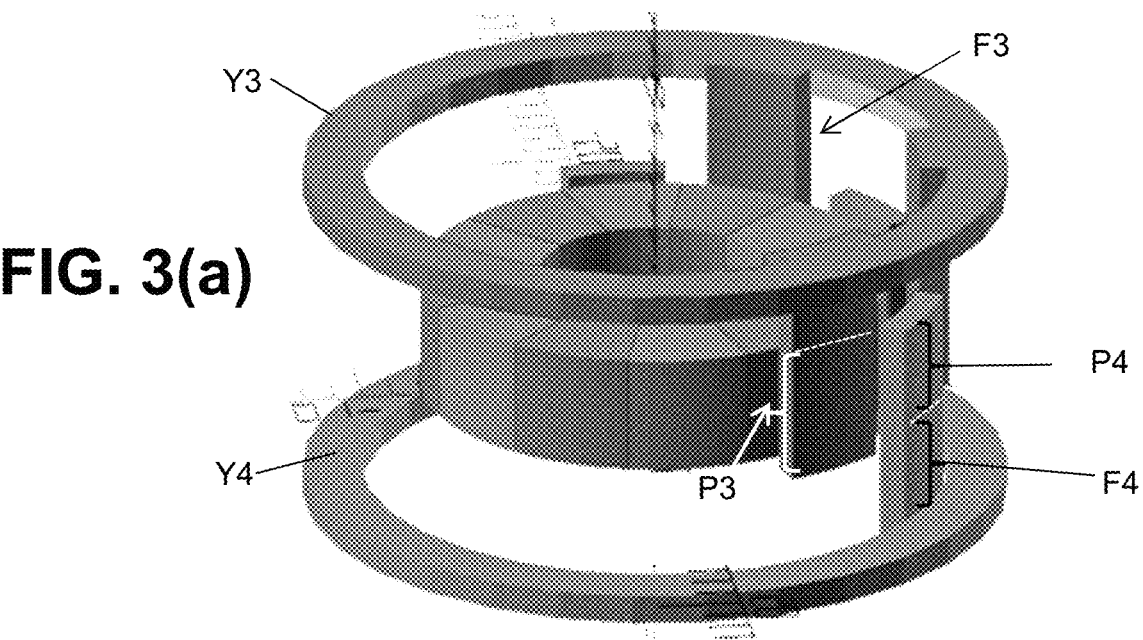
FIG. 3(b)
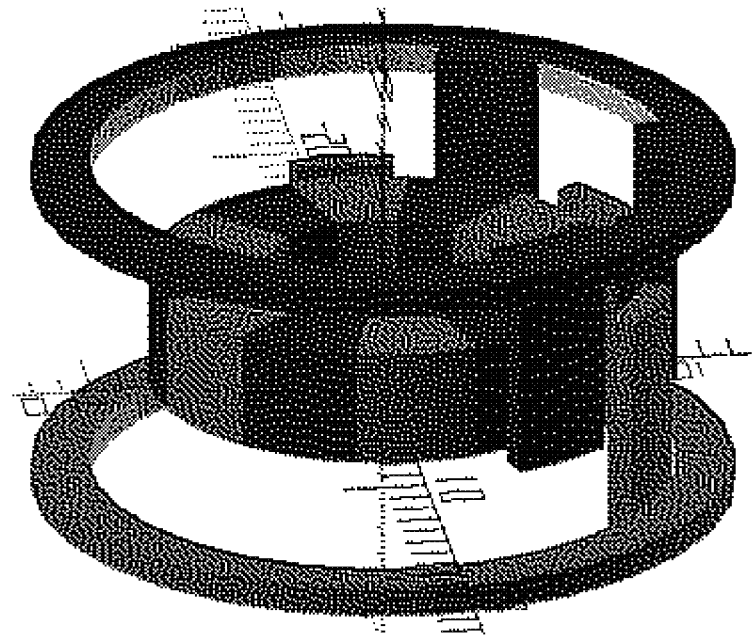
FIG. 3

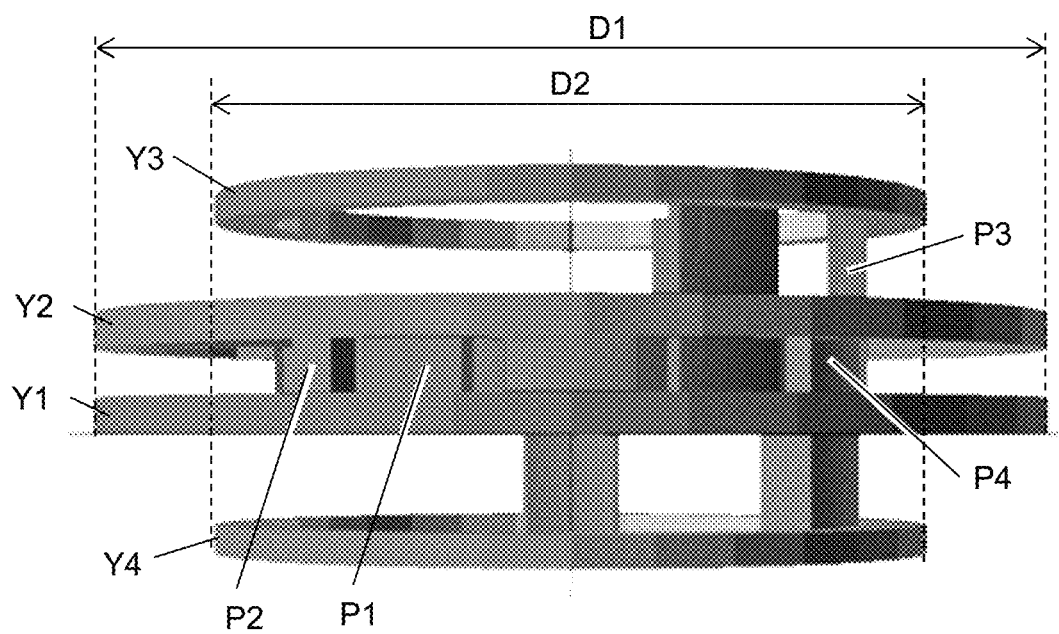
FIG. 4(a)
FIG. 4(b)
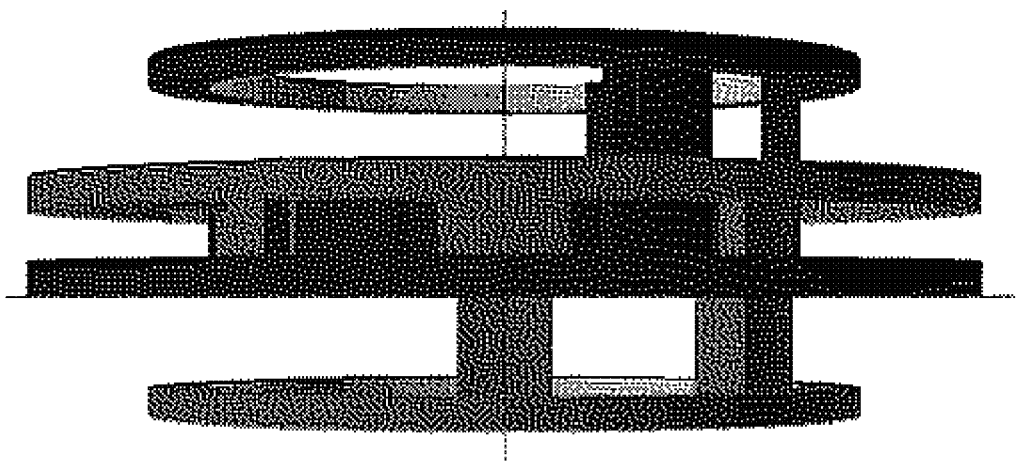
FIG. 4

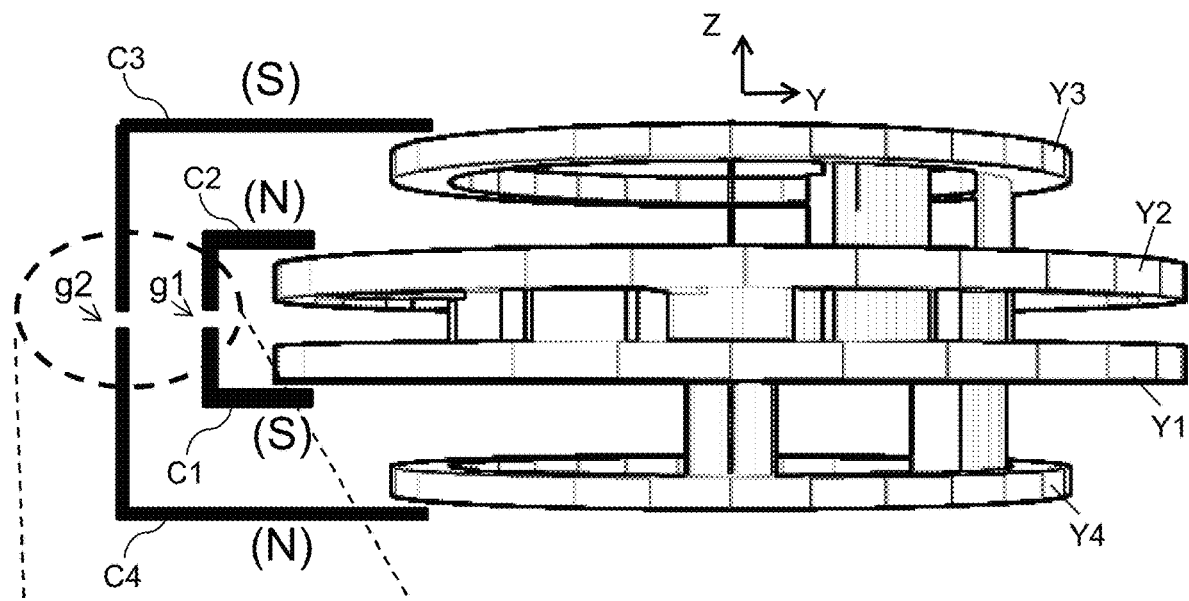
FIG. 4(d)
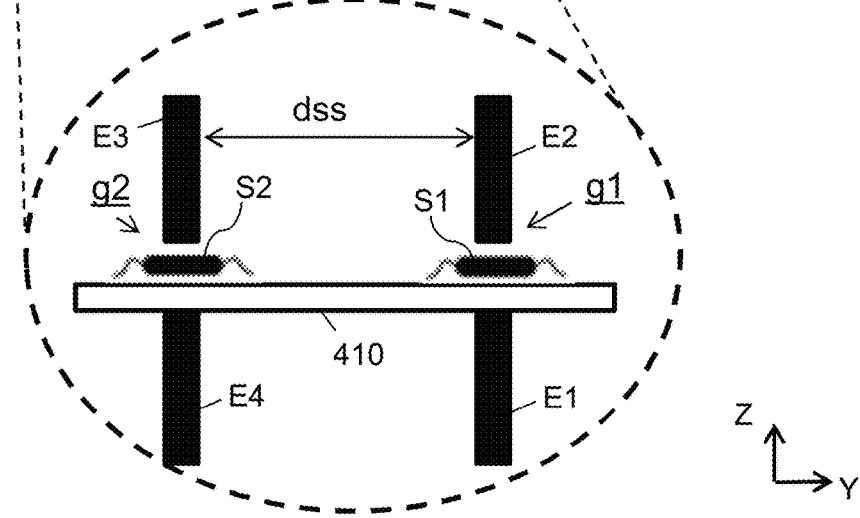
FIG. 4(e)
FIG. 4

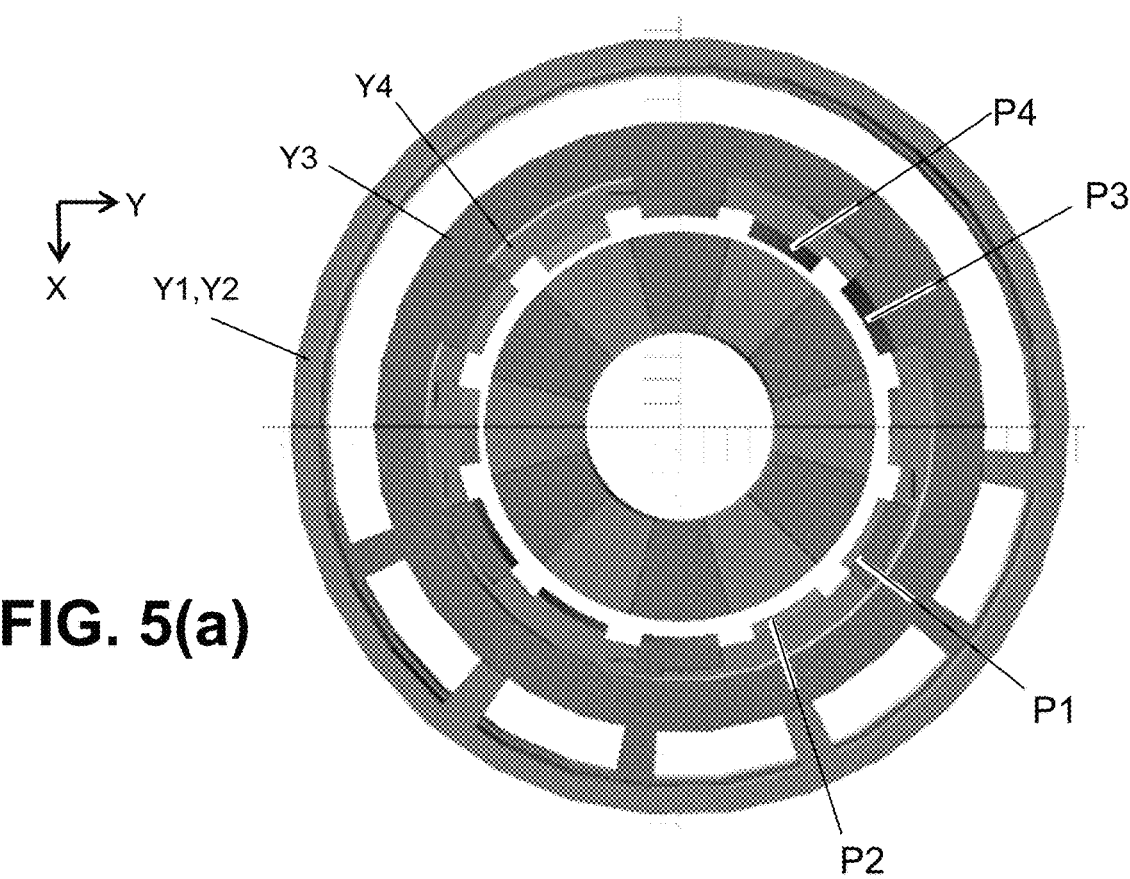
FIG. 5(a)
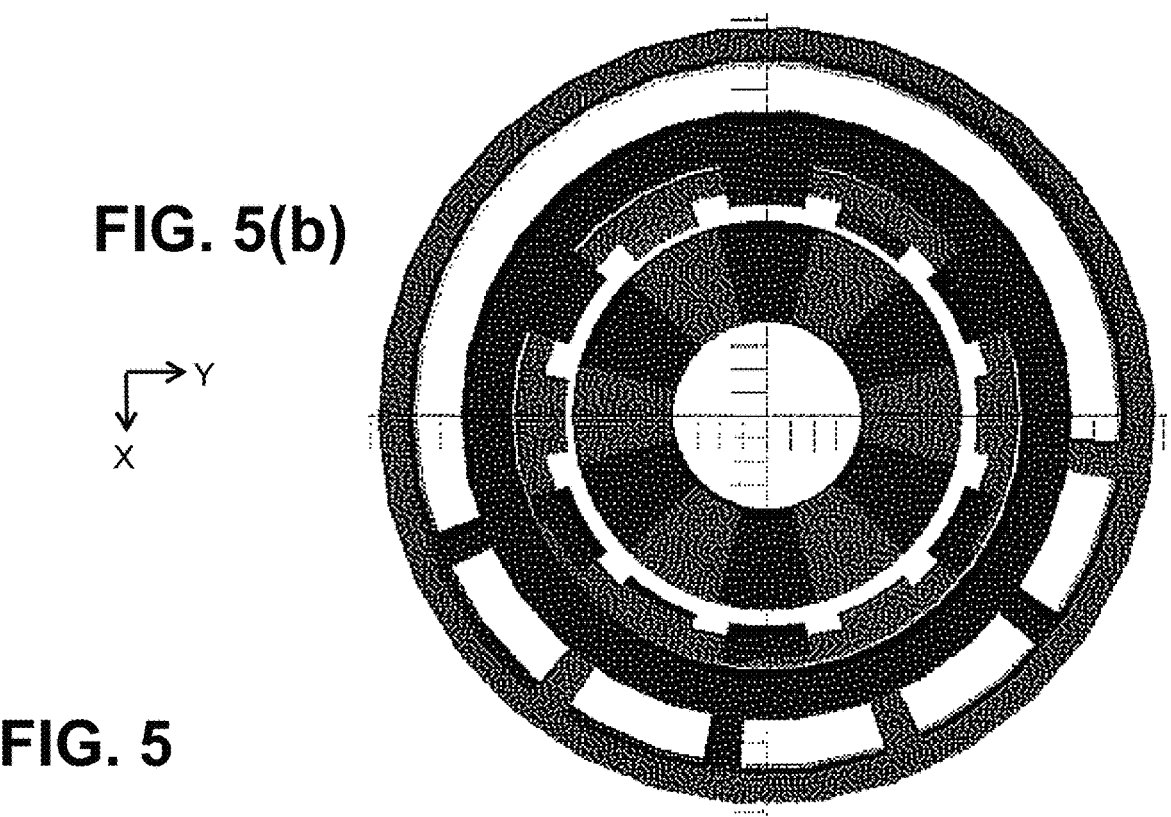
FIG. 5(b)
FIG. 5

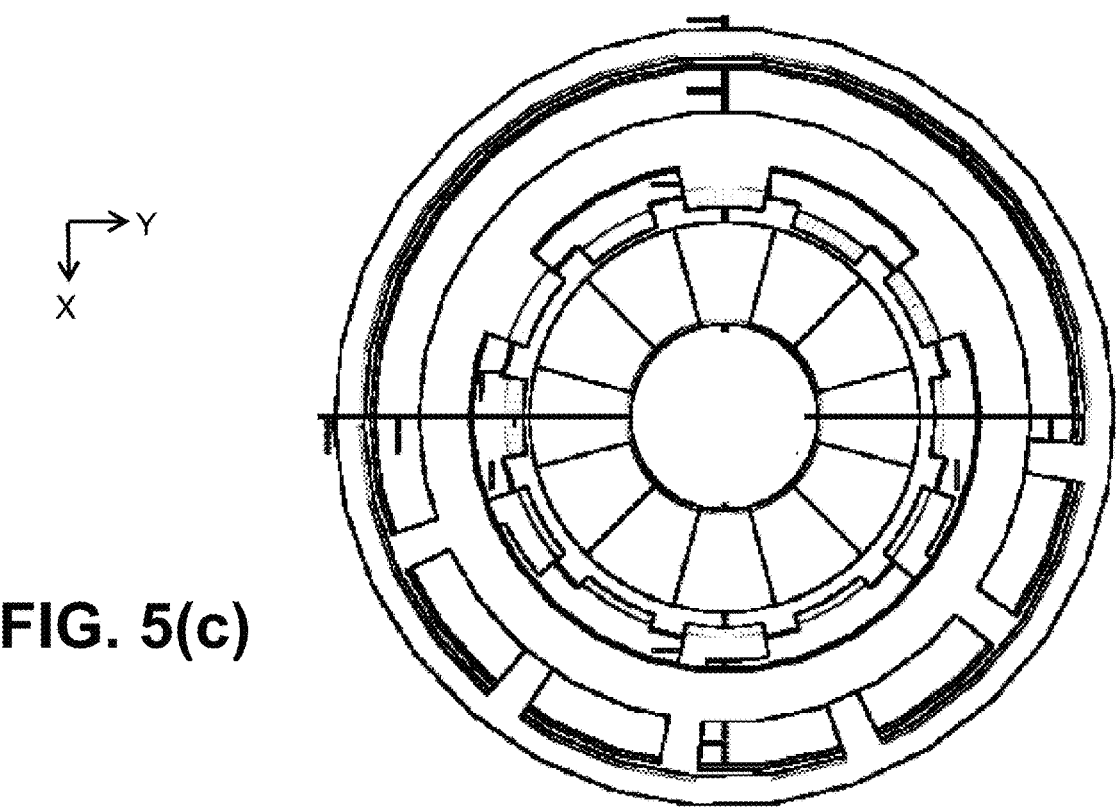
FIG. 5(c)
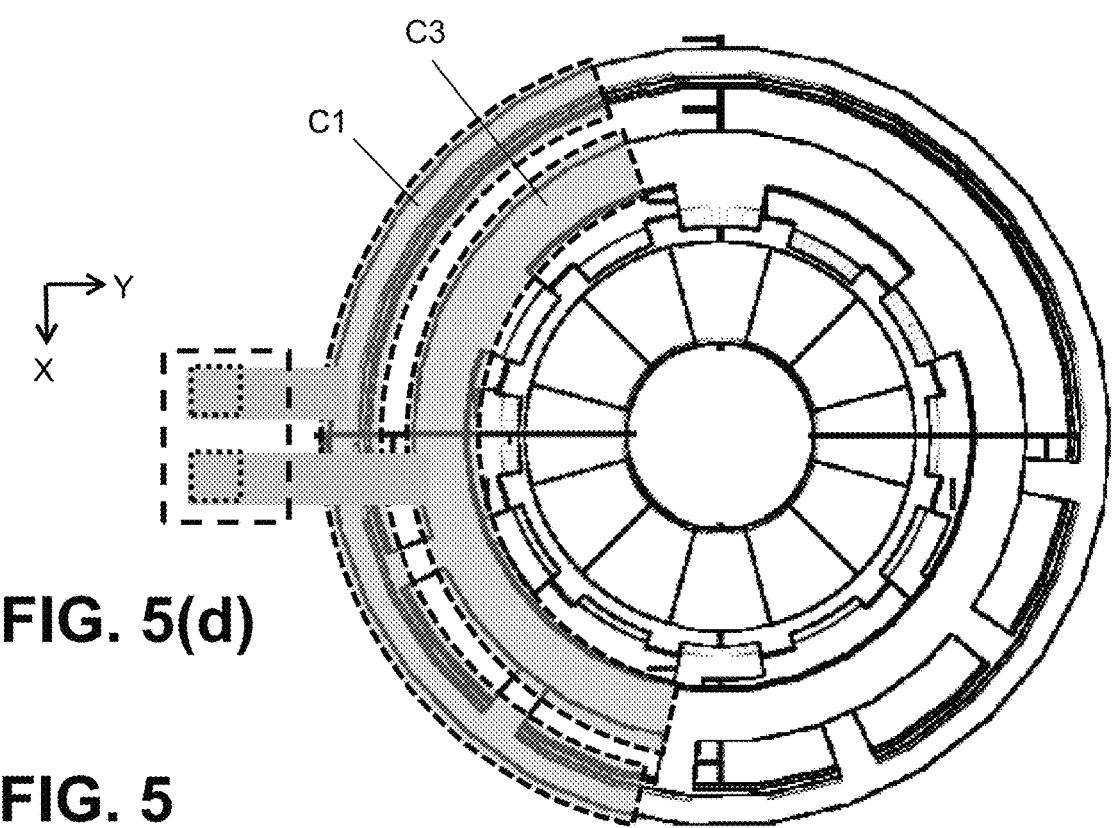
FIG. 5(d)
FIG. 5

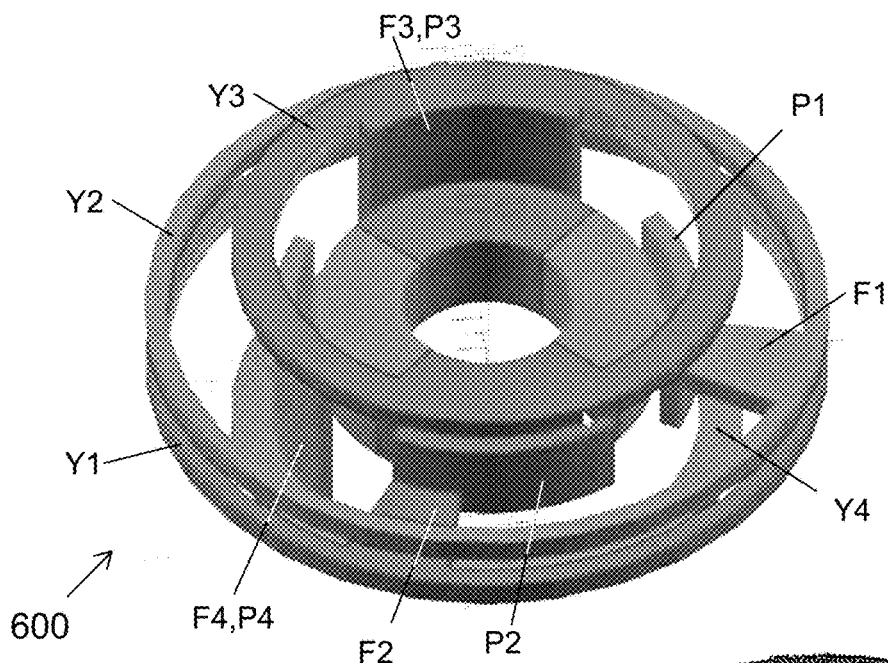
FIG. 6(a)
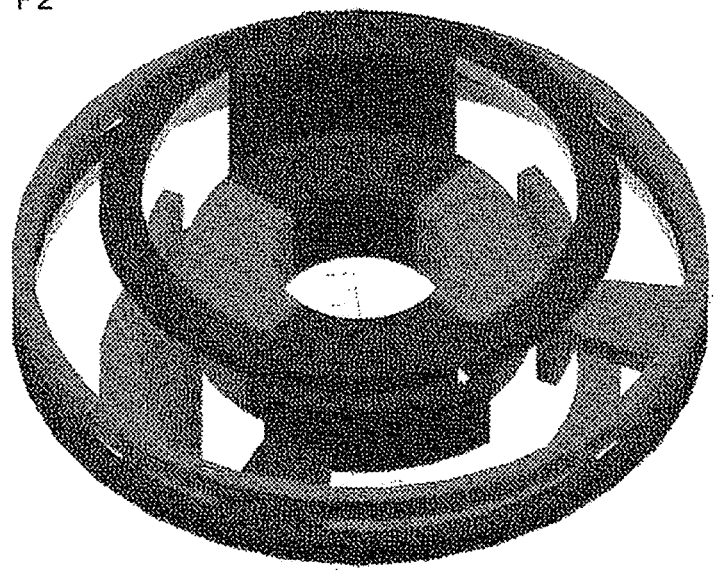
FIG. 6(b)
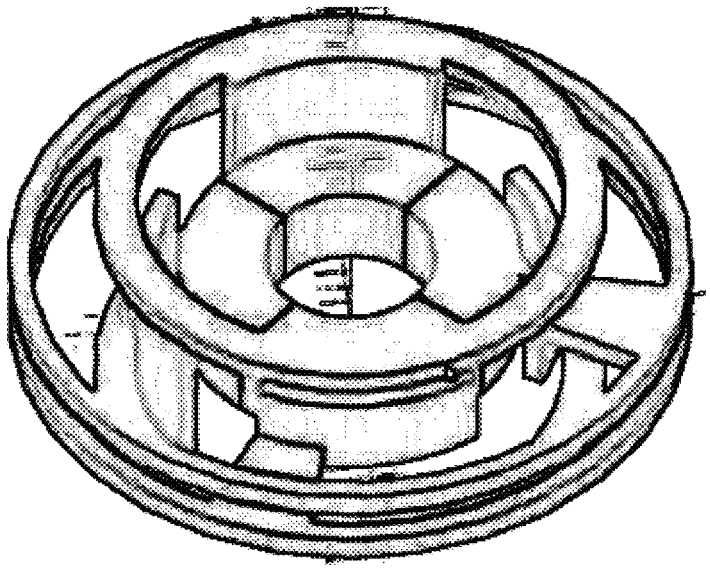
FIG. 6(c)
FIG. 6

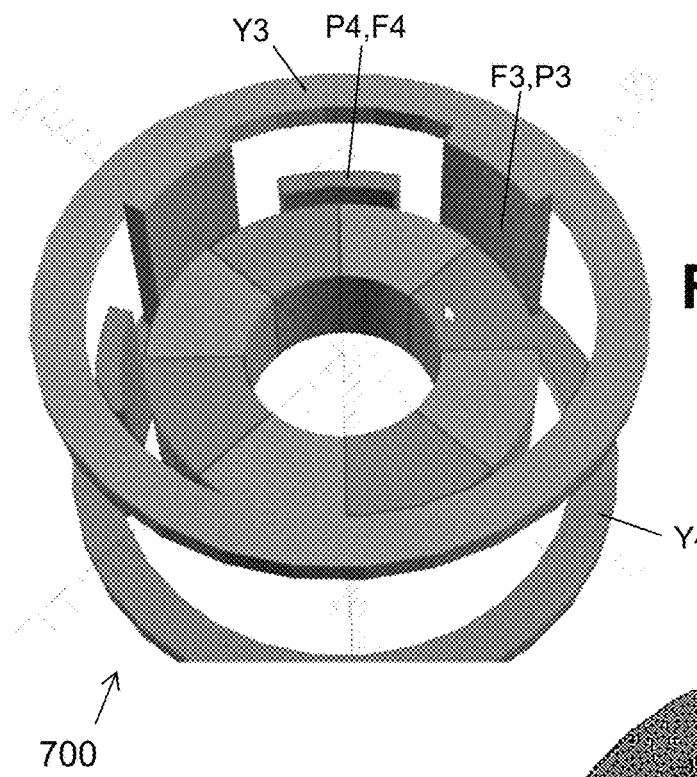
FIG. 7(a)
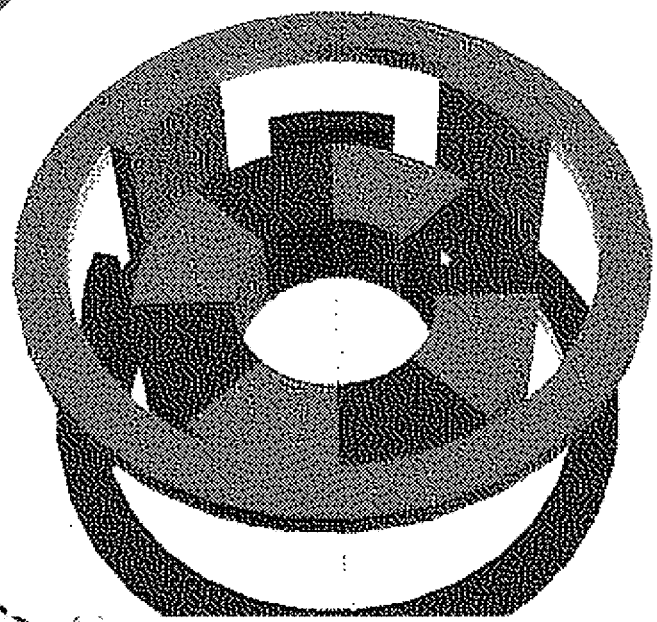
FIG. 7(b)
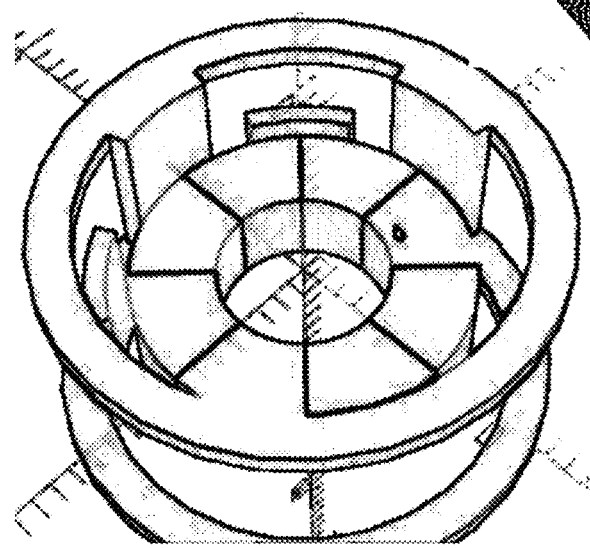
FIG. 7(c)
FIG. 7

SENSOR STRUCTURE FOR MEASURING TORQUE

FIELD OF THE INVENTION

The present invention relates in general to the field of torque sensors and methods of measuring a torque applied to a shaft. The present invention relates in particular to a sensor structure for measuring a torque applied to a torsion bar used in a rotating force transmission system, in particular, for use in an electric power steering system.

BACKGROUND OF THE INVENTION

A torque sensor for measuring a torque applied to a torsion bar is described for example in patent document US20020189371A1. This document describes a torque sensor having a torsion bar coaxially in alignment with input and output shafts, a ring-shaped magnet fixed to an axial end of the input shaft, a pair of magnetic yokes fixed to an axial end of the output shaft, and a magnetic sensor for detecting magnetic flux density generated between the pair of magnetic yokes. Each of the magnetic yokes is provided with claws arranged circumferentially with respect to the magnet. A magnetic sensor is inserted in an axial gap between the pair of magnetic yokes without contacting the magnetic yokes. A disadvantage of this torque sensor is that it is not robust against an external disturbance field.

Another torque sensor using a similar structure is described in patent publication EP3505894A1. Also, this torque sensor is not robust against an external disturbance field.

Another torque sensor using a similar structure is described in patent publication DE102015122179A1. This torque sensor uses three discrete sensors to reduce the influence of an external disturbance field.

SUMMARY OF THE INVENTION

It is an object of embodiments of the present invention to provide a sensor structure for measuring a torque applied to a shaft in a manner which is highly robust against an external disturbance field.

It is also an object of embodiments of the present invention to provide a torque sensor comprising such a sensor structure.

It is also an object of embodiments of the present invention to provide a kit of parts comprising some of the main components of this sensor structure.

It is also an object of embodiments of the present invention to provide a method of measuring a torque in a manner which is highly robust against an external disturbance field.

These and other objectives are accomplished by a sensor structure and a method provided by the present invention.

According to a first aspect, the present invention provides a sensor structure for measuring a torque between a first shaft and a second shaft interconnected by means of a torsion bar, the sensor structure comprising: a ring magnet mechanically connected or connectable to the first shaft, and comprising a number of North and South poles alternatingly arranged at a circumference of the ring magnet; a first pair of magnetic yokes mechanically connected or connectable to the second shaft, and comprising a first magnetic yoke and a second magnetic yoke, the first magnetic yoke being mechanically and magnetically coupled to one or more first pads by means of first fingers, the second magnetic yoke being mechanically and magnetically coupled to one or more second pads by means of second fingers, the first and second fingers projecting respectively from the first and second yoke in a mainly radial direction; a second pair of magnetic yokes mechanically connected or connectable to the second shaft, comprising a third magnetic yoke, and a fourth magnetic yoke, the third magnetic yoke being mechanically and magnetically coupled to one or more third pads by means of third fingers, the fourth magnetic yoke being mechanically and magnetically coupled to one or more fourth pads by means of fourth fingers, the third and fourth fingers projecting respectively from the third and fourth yoke in a mainly axial direction; a first and a second flux collector arranged in the vicinity of the first and second magnetic yoke respectively for collecting field lines of the magnetic field generated by the magnet and guided via the first and second magnetic yoke, and shaped so as to form a first gap between these collectors; a third and a fourth flux collector arranged in the vicinity of the third and fourth magnetic yoke respectively for collecting field lines of the magnetic field generated by the magnet and guided via the third and fourth magnetic yoke, and shaped so as to form a second gap between these collectors; a first magnetic sensor located in the first gap and configured for measuring at least one magnetic field component in said first gap and for providing a first signal; a second magnetic sensor located in the second gap and configured for measuring at least one magnetic field component in said second gap and for providing a second signal; wherein the second yoke is axially located between the first and third yoke, and wherein the first yoke is axially located between the second and fourth yoke; wherein the pads are arranged such that, when a torque is applied, each of the first and third pads faces a major portion of a first type of the magnetic poles, and each of the second and fourth pads faces a major portion of a second type of the magnetic poles different from the first type; a processing circuit configured for determining a value of the torque based on the first and the second signal, in a manner which reduces or substantially eliminates an influence of an external disturbance field.

It is an advantage of this structure that it contains a first sensor for measuring a first magnetic flux generated by the magnet (flowing e.g. from N poles to S poles, or vice versa) and that it contains a second sensor for measuring a second magnetic flux generated by the magnet (flowing e.g. from S poles to N poles, or vice versa) which flux signals may be opposite to each other, or at least have a predefined relation defined mainly by the geometry of the structure. Using this predefined relationship (which can be determined for example by design, or by simulation, or by calibration), a superimposed signal caused by an external disturbance field can be determined and reduced or eliminated.

It is a major advantage of this structure that it allows to measure the applied torque in a manner which is highly robust against an external disturbance field, which is of major importance for example in electrical vehicles and/or industrial applications, e.g. in robotics.

In an embodiment, the processing circuit is configured for calculating a value indicative of the flux generated by the magnet by linearly combining the first and second signal or by solving a matrix equation, and by converting the amount of flux into a value of the torque.

In an embodiment, each of the first, second, third and fourth magnetic yoke has a ring shape.

In an embodiment, the first and second magnetic yoke have a first diameter; and the third and fourth magnetic yoke have a second diameter different from the first diameter.

In preferred embodiments, the second diameter is smaller than the first diameter.

In an embodiment, the first collector comprises a first extension and the second collector comprises a second extension, shaped so as to form said first gap; and the third collector comprises a third extension and the fourth collector comprises a fourth extension shaped so as to form said second gap.

In an embodiment, the first and second extension are aligned in the axial direction, and the third and fourth extension are aligned in the axial direction.

In an embodiment, the first magnetic sensor is configured for measuring a first magnetic field component in the axial direction; and the second magnetic sensor is configured for measuring a second magnetic field component in the axial direction; and the circuit is configured for combining the first measured value indicative of the first magnetic field component and the second measured value indicative of the second magnetic field component in a manner which is highly insensitive to an external disturbance field oriented in or having a component in the axial direction.

In an embodiment, the first sensor is or comprises a first horizontal Hall element configured for providing said first signal; and the second sensor is or comprises a second horizontal Hall element configured for providing said second signal, and being oriented parallel with the first horizontal Hall element; and the processing circuit is configured for calculating a value indicative of the flux generated by the magnet by linearly combining the first and second signal or by solving a matrix equation, and by converting the amount of flux into a value of the torque.

In an embodiment, the sensor structure comprises only one ring magnet.

In an embodiment, each of the first, second, third and fourth pads are located at substantially the same axial position.

In an embodiment, each of the first, second, third and fourth pads are located at substantially the same radial position.

In an embodiment, the first magnetic sensor and the second magnetic sensor are located on a single substrate.

This substrate, for example a printed circuit board (PCB) can be oriented in any direction, but preferably is oriented either parallel to the axis of the first and second shaft, or perpendicular to the axis of the first and second shaft.

In an embodiment, the first magnetic sensor is located at a first axial position, and the second sensor is arranged at a second axial position substantially equal to the first axial position; and the sensor structure further comprises a printed circuit board oriented substantially perpendicular to the first and second shaft; and the first magnetic sensor and the second magnetic sensor are both located on said printed circuit board.

This offers the advantage that the orientation of the first and second sensor is substantially identical, and thus that the influence of an external disturbance field is substantially identical.

In an embodiment, the total number of pads is equal to the total number of magnetic poles situated at the outer circumference of the magnet.

In an embodiment, the total number of magnetic poles at the circumference of the ring magnet is an integer multiple of four.

It is an advantage of embodiments with a lower number of poles on the circumference of the magnet, and with a lower number of pads (e.g. only one pad per ring, or only two pads per ring), because such a structure is mechanically easier to construct.

It is an advantage of embodiments with a larger number of poles that they are typically more sensitive (a smaller distortion provides a larger signal) and are typically more accurate inter alia because a sum of flux lines from different poles and pads is taken rather than the flux from a single pole and a single pad.

The skilled person can easily find a good compromise, depending on the envisioned application.

For example, FIG. 1 to FIG. 5 shows an embodiment with a magnet having 12 poles at its circumference, and wherein each ring has 3 pads. For example, FIG. 6 shows an embodiment with a magnet having 4 poles at its circumference, and wherein each ring has 1 pad. For example, FIG. 7 shows an embodiment with a magnet having 8 poles at its circumference, and wherein each ring has 2 pads.

In an embodiment, each of the magnetic poles at the circumference of the ring magnet is facing an associated pad.

It is an advantage of this embodiment that each yoke has an equal number of pads. Although that is not absolutely required for the invention to work, it may provide higher accuracy.

In an embodiment, the total number of magnetic poles at the circumference of the ring magnet is at least six.

In an embodiment, the total number of magnetic poles at the circumference of the ring magnet is an integer multiple of two, but not an integer multiple of four.

It is an advantage of this embodiment that it allows more freedom to choose the ring magnet.

In an embodiment, the flux collectors have a ring shape or a partial ring shape and are arranged at a predefined axial distance from the corresponding yoke.

The first and second flux collector can be arranged "axially between" the first and second yoke; or "axially outside" the first and second yoke; or one of the first and second collector can be arranged between the first and second yoke, and the other of the first and second collector can be arranged outside the first and second yoke.

Likewise, the third and fourth flux collector can be arranged "axially between" the third and fourth yoke; or "axially outside" the third and fourth yoke; or one of the third and fourth collector can be arranged between the third and fourth yoke, and the other of the third and fourth collector can be arranged outside the third and fourth yoke.

Preferably, the distance between the first and second pads is larger than the distance (or opening) of the first gap.

Preferably, the distance between the third and fourth pads is larger than the distance (or opening) of the second gap.

The opening (e.g. shortest distance between the respective extensions) of the first gap may be substantially equal to the opening of the second gap (e.g. within a tolerance margin of about +/−10%).

In an embodiment, an axial distance between the third yoke (Y3) and each of the first and second yoke (Y1, Y2) is at least 5 mm or at least 10 mm; and/or an axial distance between the fourth yoke (Y4) and each of the first and second yoke (Y1, Y2) is at least 5 mm or at least 10 mm.

Said distance needs to be sufficiently large for limiting the leakage flux.

According to a second aspect, the present invention also provides a kit of parts for forming a sensor structure according to the first aspect, the kit of parts comprising: said first yoke having one or more first fingers and first pads; said second yoke having one or more second fingers and second pads; said third yoke having one or more third fingers and third pads; said fourth yoke having one or more fourth fingers and fourth pads; said first collector optionally having a first extension; said second collector optionally having a second extension; said third collector optionally having a third extension; said fourth collector optionally having a fourth extension.

In an embodiment, the kit of parts further comprises a ring magnet.

In an embodiment, the kit of parts further comprises a first shaft, and a second shaft, and a torsion bar.

According to a third aspect, the present invention also provides a method of measuring a torque in a manner which is less sensitive or highly insensitive to an external disturbance field, comprising the steps of: a) providing a sensor structure according to the first aspect; b) measuring a first magnetic flux by the first sensor situated in the first gap; c) measuring a second magnetic flux by the second sensor situated in the second gap; d) determining a value of the torque in a manner which reduces or substantially eliminates an influence of an external disturbance field, based on the signals obtained from the first and second sensor.

In an embodiment, step d) comprises calculating a value indicative of the flux generated by the magnet by linearly combining the first and second signal, or by solving a matrix equation.

In an embodiment, step d) may comprise solving the following set of equations:

$$\begin{cases} \text{Signal1} = \text{Flux\_Yoke34} + K * B\text{ext} \\ \text{Signal2} = \text{Flux\_Yoke12} + L * B\text{ext} \\ \text{Flux\_Yoke34} = M * \text{Flux\_Yoke12} \end{cases}$$

wherein Signal1 is the signal obtained from the first sensor, Signal2 is the signal obtained from the second sensor, Flux_Yoke34 is the magnetic flux guided through the magnetic circuit containing the third and fourth yoke, the third and fourth pads, the third and fourth fingers, and the third and fourth collectors (and if present the first and second extension) and the second gap, Flux_Yoke12 is the magnetic flux guided through the magnetic circuit containing the first and second yoke, the first and second pads, the first and second fingers, the first and second collectors (and if present the third and fourth extension) and the second gap, Bext is an external magnetic field component, and K and L and M are predefined constants, which may be determined by design or by simulation or by calibration or in any other suitable way.

In an embodiment, the magnitude of the flux Flux_Yoke12 is substantially equal to the magnitude of the flux Flux_Yoke34.

In an embodiment, step d) further comprises converting the calculated value of the flux into a torque value by means of a look-up table or using a mathematical expression.

The present invention is also directed to a torque sensor comprising a sensor structure as described above, and further comprising said first shaft, said second shaft, and said torsion bar.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 1 to FIG. 5 illustrate a first exemplary sensor structure according to an embodiment of the present invention. This sensor structure has a ring magnet with twelve poles, and each of the four yokes has three pads.

FIG. 1 shows a perspective view of a 3D model of the sensor structure. FIG. 1(a) shows a color picture. FIG. 1(b) shows a dithered picture. FIG. 1(c) shows a line drawing. FIG. 1(d) illustrates what is meant with a radially magnetized magnet (for a magnet with 8 poles at its circumference).

FIG. 2 shows a perspective view of the magnet, and a first and second yoke of the sensor structure of FIG. 1, each yoke being connected to respective pads via respective, substantially radially oriented fingers. FIG. 2(a) shows a color picture. FIG. 2(b) shows a dithered picture. FIG. 2(c) shows a line drawing.

FIG. 3 shows a perspective view of the magnet, and a third and fourth yoke of the sensor structure of FIG. 1, each yoke being connected to respective pads via respective, substantially radially oriented fingers. FIG. 3(a) shows a color picture. FIG. 3(b) shows a dithered picture. FIG. 3(c) shows a line drawing.

FIG. 4 shows a front view of the sensor structure of FIG. 1. FIG. 4(a) shows a color picture. FIG. 4(b) shows a dithered picture. FIG. 4(c) shows a line drawing.

FIG. 4(d) is a copy of FIG. 4(c) but additionally shows two pairs of flux collectors, each having respective extensions forming a first and second air gap.

FIG. 4(e) shows an example of how a first and a second magnetic sensor can be positioned inside the first and second air gap.

FIG. 5 shows a top view of the sensor structure of FIG. 1. FIG. 5(a) shows a color picture. FIG. 5(b) shows a dithered picture. FIG. 5(c) shows a line drawing.

FIG. 5(d) is a copy of FIG. 5(c) but additionally shows two flux collectors arranged in the vicinity of the corresponding yokes.

FIG. 6 shows a second exemplary sensor structure according to an embodiment of the present invention. This sensor structure has a ring magnet with only four poles, and each of the four yokes has a single pad. FIG. 6(a) shows a color picture of a perspective view of a 3D model of the sensor structure. FIG. 6(b) shows a dithered picture. FIG. 6(c) shows a line drawing.

FIG. 7 shows a third exemplary sensor structure according to an embodiment of the present invention. The first and second yoke and the corresponding pads and fingers are not shown for illustrative purposes. This sensor structure has a ring magnet with eight poles, and each of the four yokes has two pads. FIG. 7(a) shows a color picture of a perspective view of a 3D model of the sensor structure. FIG. 7(b) shows a dithered picture. FIG. 7(c) shows a line drawing.

Figures 2, 2C:
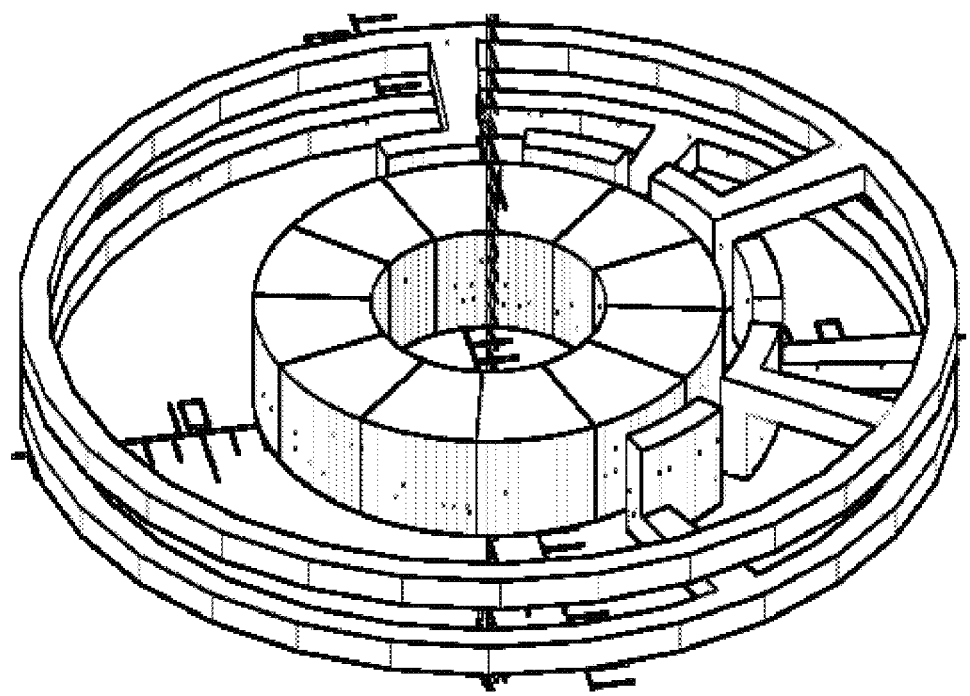

The drawings are only schematic and are non-limiting. In the drawings, the size of some of the elements may be exaggerated and not drawn on scale for illustrative purposes. Any reference signs in the claims shall not be construed as

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures, and techniques have not been shown in detail in order not to obscure an understanding of this description.

In this document, the terms "claws" and "pads" are used as synonyms. They refer to the elements located near the circumference of the ring magnet. In preferred embodiments of the present invention, the pads can be considered as being cut-out from a virtual cylindrical wall around the ring magnet.

In this document, the terms "first shaft and second shaft interconnection by a torque bar" means the same as "first shaft portion and second shaft portion interconnected by a torque bar".

The present invention relates to sensor structures for measuring a torque applied to a rotatable shaft, for example a steering wheel, without using sliding contacts. In the prior art (e.g. in the documents cited in the background section) structures are described comprising a ring magnet with a plurality of N and S poles, a torsion bar interconnecting a first and second shaft portion, magnetic yokes connected to a plurality of claws arranged at a circumference of the ring magnet. These structures are capable of measuring a magnetic flux generated by the ring magnet, the magnetic flux being modulated by a (elastic) deformation of the (resilient) torsion bar due to the torque applied. It exploits the fact that when a torque is applied, the torsion bar is twisted and deformed, causing the relative position between the multipolar magnet and the magnetic pads to change, in turn causing the magnetic flux density to change. By measuring the flux density between the magnetic yokes, a value of the torque can be calculated in manners known per se in the art, e.g. taking into account the stiffness of the torsion bar. Several variants of such a torque sensor exist.

It remains a challenge to measure the torque applied to the shaft in a manner which is highly insensitive to an external disturbance field. This is especially important in electric vehicles where high currents can cause relatively high disturbance fields.

In order to solve this problem, the present invention proposes a sensor structure for measuring a torque applied to a first shaft and a second shaft interconnected by means of a torsion bar. The first and second shaft and the torsion bar are not explicitly shown in the drawings of the application, in order not to obscure the drawings, and because these components are not the main focus of the present invention. But the shafts and the torsion bar can for example be chosen similar to or identical to those described in EP3505894A1 (see e.g. FIG. 2 thereof), the entire document being incorporated herein by reference.

The sensor structure comprises: a ring magnet mechanically connected or connectable to the first shaft and comprising a number of North and South poles alternatingly arranged at a circumference of the ring magnet.

The sensor structure further comprises: a first pair of magnetic yokes (also referred to herein as "the inner yokes") mechanically connected or connectable to the second shaft. The first pair of magnetic yokes comprises a first magnetic yoke Y1 and a second magnetic yoke Y2. The first magnetic yoke Y1 is mechanically and magnetically coupled to one or more first pads (or 'claws') P1 by means of first fingers F1. The second magnetic yoke Y2 is mechanically and magnetically coupled to one or more second pads P2 by means of second fingers F2. These first and second fingers F1, F2 project respectively from the first and second yoke in a mainly radial direction.

The sensor structure further comprises: a second pair of magnetic yokes (also referred to herein as "the outer yokes") mechanically connected to the second shaft. The second pair of magnetic yokes comprises a third magnetic yoke Y3 and a fourth magnetic yoke Y4. The third magnetic yoke is mechanically and magnetically coupled to one or more third pads P3 by means of third fingers F3. The fourth magnetic yoke Y4 is mechanically and magnetically coupled to one or more fourth pads P4 by means of fourth fingers F4. The third and fourth fingers project respectively from the third and fourth yoke in a mainly axial direction (Z).

The sensor structure further comprises: a first and a second flux collector C1, C2 arranged in close vicinity of the first and second magnetic yoke Y1, Y2 for collecting field lines of the magnetic field generated by the magnet and guided via the first and second magnetic yoke, and the collectors are shaped so as to form a first gap G1 between these collectors C1, C2 (e.g. as illustrated in FIG. 4d and FIG. 4e).

The sensor structure further comprises: a third and a fourth flux collector C3, C4 arranged in close vicinity of the third and fourth magnetic yoke Y3, Y4 for collecting field lines of the magnetic field generated by the magnet and guided via the third and fourth magnetic yoke, and the collectors are shaped so as to form a second gap G2 between these collectors C3, C4.

The sensor structure further comprises: a first magnetic sensor S1 located or mainly located in the first gap G1 and configured for measuring at least one magnetic field component (e.g. Bz1 oriented in the Z-direction) in said first gap G1 and for providing a first signal associated with this measurement. This signal can be a first scalar (i.e. a first number with a positive or a negative sign).

The sensor structure further comprises: a second magnetic sensor S2 located or mainly located in the second gap G2 and configured for measuring at least one magnetic field component (e.g. Bz2 oriented in the Z-direction) in said second gap G2 and for providing a second signal associated with this measurement. This signal can be a second scalar (i.e. a second number with a positive or a negative sign).

The yokes are arranged such that the second yoke Y2 is axially located between the first and third yoke Y1, Y3 and the first yoke Y1 is axially located between the second and fourth yoke Y2, Y4.

The pads are arranged such that, when a torque is applied, the first and third pads P1, P3 face a major portion of a first type of the magnetic poles (e.g. mainly North), while the second and fourth pads P2, P4 face a major portion of a second type of the magnetic poles (e.g. mainly South), different from the first type of poles.

The sensor structure further comprises: a processing circuit for determining a value of the torque based on the first and the second signal, in a manner which reduces or substantially eliminates an influence of an external disturbance field. This processing circuit may be part of the first sensor device, or part of the second sensor device, or part of a third device physically located outside of the first and second sensor device. The first sensor device, second sensor device and third device may be mounted on a printed circuit board (PCB).

As far as the inventors are aware, such a structure does not exist. While the mere idea of measuring the flux in two opposite directions and then subtracting the values from each other may be conceptually rather simple, finding a mechanical structure actually capable of doing that is far from trivial, because the structure should not have too much leakage, and because the structure has to be producible.

The present invention relies partly on the insight (1) that the pads (or claws) do not need to be directly mounted to the yokes, but can be connected thereto via fingers (which in itself is not trivial because it increases the size of the sensor structure and increases the magnetic resistance, but especially on the insight (2) that the fingers of one pair of yokes can be oriented mainly or substantially radially, while the fingers of the outer pair of yokes can be oriented mainly or substantially axially. Thus, despite the fact that the pads are alternately arranged around the ring magnet, the substantially perpendicular orientation of the fingers makes it possible to keep the magnetic circuits sufficiently separated from each other, without causing too much leakage.

When a torque is applied to the first and second shaft, a deformation of the torque bar interconnecting the first and second shaft will cause the ring magnet, which is fixedly connected to the first shaft, to rotate relative to the magnetic yokes, which are fixed to the second shaft. The amount of rotation depends on the torque being applied, and the stiffness of the torsion bar.

Because of the rotation, the position of the N and S poles of the magnet change relative to the position of the pads, which in turn influences the amount of flux that passes through the magnetic circuits formed by the pads, the fingers, the yokes, the collectors, the extensions and the air gaps. By the specific arrangement of the pads as described above, the flux density originating from (some of the poles of) the magnet and sensed by the first sensor is related to the flux density originating from (some of the poles of) the magnet and sensed by the second sensor.

In the absence of a disturbance field, ideally the signals are equal in size and have opposite sign, but that is not absolutely required, and in general it suffices that the relationship is known. In preferred embodiments, the relationship is linear, and can be formulated by the following equation:

$$\text{Flux\_Yoke34} = M * \text{Flux\_Yoke12} \quad [1]$$

wherein Flux_Yoke12 is the Flux density caused by the magnet and conducted via the inner yokes Y1, Y2; and wherein Flux_Yoke34 is the flux density caused by the magnet and conducted via the outer yokes Y3, Y4, and M is a predefined constant.

In the presence of an external disturbance field, in particular a homogeneous disturbance field, the first sensor S1 measures a signal which can be represented by:

$$\text{Signal1} = \text{Flux\_Yoke12} + K * B\text{ext} \quad [2]$$

where signal1 represents the signal measured by the first sensor (e.g. the value of Bz oriented in the axial direction), Bext is a magnitude of an external field component measured by the first sensor, and K is a predefined constant, and the second sensor S2 measures a signal which can be represented by:

$$\text{Signal2} = \text{Flux\_Yoke34} + L * B\text{ext} \quad [3]$$

where signal2 represents the signal measured by the second sensor (e.g. the value of Bz oriented in the axial direction), Bext is the magnitude of the external field component measured by the second sensor (assumed to be identical to that of the first sensor), and L is a predefined constant.

If the value of signal1 and signal2 are measured, the equations [1], [2] and [3] form a set of 3 equations in 3 unknowns: Flux_Yoke12, Flux_Yoke34 and Bext, which has a single solution. The solution can be calculated by linear algebra, by substitution, my matrix multiplication, or in any other suitable way. Importantly, from these equations the flux generated by the magnet can be calculated in a manner which is independent of the external disturbance field. Once the flux is known, the amount of flux can easily be converted into a value of the torque, in ways known in the art, e.g. by taking into account characteristics of the torsion bar, such as its mechanical stiffness.

These are the main principles of the present invention.

Referring now to the Figures.

FIG. 1 to FIG. 5 illustrate a first exemplary sensor structure according to an embodiment of the present invention. This sensor structure has a ring magnet with twelve poles, and each of the four yokes has three pads. But the present invention is not limited hereto, and magnets with a different number of poles, and yokes with a different number of pads are also possible. For example, in FIG. 6 a sensor structure will be described comprising a magnet with only four poles at its circumference, and each yoke having only one pad. And in FIG. 7 another sensor structure will be described comprising a magnet with eight poles at its circumference, and each yoke having exactly two pads. From these examples it can be easily understood that the present invention will also work with a magnet having 4*N poles at its circumference (N being an integer number, for example 1, 2, 3, 4, 5, 6, 7 etc.), and each yoke having exactly N pads.

In these examples, each yoke has a same number of pads (N in the example above), and each magnet pole has an associated pad, but that is not absolutely required, and the present invention also works if the number of pads is not the same for each yoke, and/or if the number of poles at the circumference of the magnet is higher than the total number of pads, (e.g. if some of the pads are omitted).

FIG. 1 shows a perspective view of a 3D mechanical model of the sensor structure. FIG. 1(a) shows a color picture. FIG. 1(b) shows a dithered picture. FIG. 1(c) shows a line drawing. Several drawings are provided because the quality of scanning at some patent offices is limited.

As described above, the sensor structure comprises a multi-pole ring magnet. The magnet is a permanent magnet, which may be formed of a material such as ferrite, samarium cobalt, neodymium or the like. The magnet is radially magnetized and has S-poles and N-poles alternately arranged at a predetermined pitch in a circumferential direction. FIG. 1(d) illustrates what is meant with a radially magnetized magnet (for a magnet with 8 poles at its circumference).

Referring back to FIG. 1(a) to FIG. 1(c), the pads P1, P2, P3, P4 are preferably arranged at a small distance around the magnet (e.g. at a radial distance of about 0.3 to about 1.0 mm, e.g. at a radial distance of about 0.5 mm) in order to allow the magnet to be rotated relative to the pads. The pads are preferably arranged with approximately the same pitch as the magnet poles. The pads are preferably arranged with approximately the same radial distance from the rotation axis of the magnet. If all pads are available (i.e. each pole has an associated pad, and no pads are omitted), the pads are preferably equidistantly angularly arranged around the magnet, with a spacing between them larger than the gap distance.

FIG. 2 shows a perspective view of the magnet, and of the first and second yoke Y1, Y2 of the sensor structure 100 of FIG. 1. FIG. 2(a) shows a color picture. FIG. 2(b) shows a dithered picture. FIG. 2(c) shows a line drawing.

As can be seen, the first yoke Y1 is connected to one or more (in the example: three) pads (or 'claws') P1 by means of radially oriented fingers F1. Likewise, the second yoke Y2 is connected to one or more (in the example: three) pads P2 by means of radially oriented fingers F2.

In the example shown, the pads P1 of the first yoke Y1 are arranged to face the magnet poles #2, #4 and #6, but the present invention is not limited thereto, and it is also possible to arrange these pads to face other magnet poles of the same type, for example: #8, #10 or #12.

In a preferred embodiment (not shown), the first pads P1 are evenly spread around the circumference of the magnet, meaning that they would be arranged to face for example magnet pole #2 and magnet pole #6 and magnet pole #10. The other poles of the same type, namely pole #4 and pole #8 and pole #12 would then be arranged to face the pads P3 of the third yoke Y3.

Similarly, the pads of the second yoke of the sensor structure shown in FIG. 2(a) are facing the odd numbered pads #1, #3 and #5, but that is not preferred. Instead, it would be preferred if the pads of the second yoke Y2 would face for example the poles #1 and #5 and #9, and if the pads P4 of the fourth yoke Y4 would be arranged to face the poles #3 and #7 and #11.

Evenly spreading the pads around the magnet offers the advantage that mounting tolerances or deviations are more or less averaged out.

Preferably, the height of the pads is substantially equal to the height of the magnet (as shown in FIG. 2a for the pads of the first and second yoke).

In a variant (not shown), the height of all the pads P1-P4 is substantially equal to the height of the magnet. In this case, the (circumferential) width of the axial fingers F3, F4 is smaller than the circumferential width of the pads P3, P4.

Figures 3, 3C:
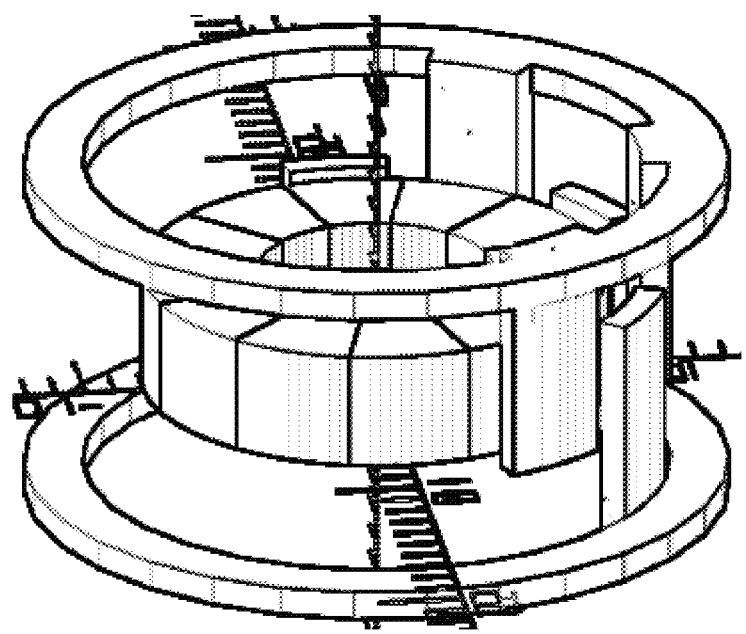

FIG. 3 shows a perspective view of the magnet, and of the third and fourth yoke Y3, Y4 of the sensor structure 100 of FIG. 1. FIG. 3(a) shows a color picture. FIG. 3(b) shows a dithered picture. FIG. 3(c) shows a line drawing.

As can be seen, the third yoke Y3 is connected to one or more (in the example: three) pads P3 by means of axially oriented fingers F3. Likewise, the fourth yoke Y4 is connected to one or more (in the example: three) pads P4 by means of axially oriented fingers F4.

In the example shown in FIG. 3, the fingers F3 and F4 are integrally formed with the pads and have the same circumferential width as the pads, but that is not preferred. In a preferred embodiment, the fingers F3 and F4 are narrower than the pads, which offers the advantage of reducing the amount of leakage.

Figures 4, 4C:
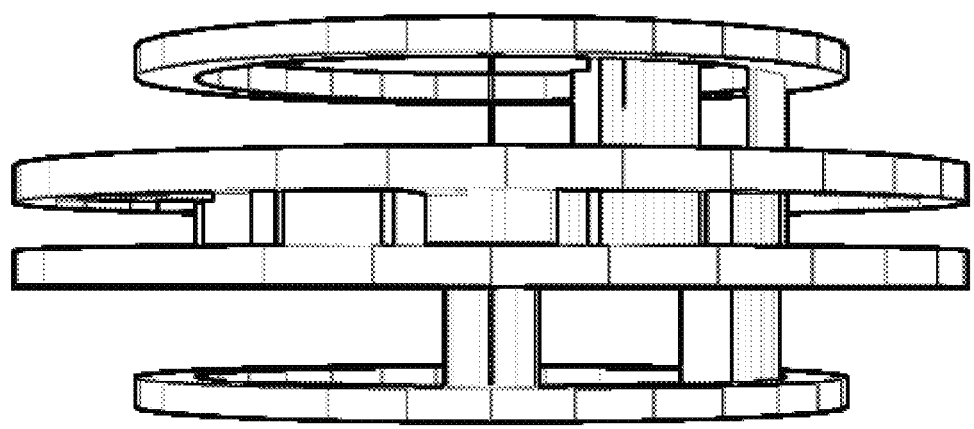

FIG. 4 shows a front view of the sensor structure 100 of FIG. 1. FIG. 4(a) shows a color picture. FIG. 4(b) shows a dithered picture. FIG. 4(c) shows a line drawing.

This picture illustrates that the yokes Y1, Y2, Y3 and Y4 are axially spaced from one another. This picture also illustrates that yoke Y1 and Y2 form the inner yokes, and that the yokes Y3 and Y4 form the outer yokes, and that the first yoke Y1 is axially arranged between the second yoke Y2 and the fourth yoke Y4, and that the second yoke Y2 is axially arranged between the first yoke Y1 and the third yoke Y3.

In this embodiment, the diameter of the first yoke Y1 is identical to the diameter of the second yoke Y2, namely D1, although that is not absolutely required; and the diameter of the third yoke Y3 is identical to the diameter of the fourth yoke Y4, namely D2, which is not absolutely required.

The picture also shows that, in the example, the diameter D2 of the outer yokes Y3, Y4 is smaller than the diameter D1 of the inner yokes Y1, Y2.

It can be appreciated from FIG. 4 that the amount of leakage between the four yokes Y1-Y4 can be determined (e.g. increased) by increasing the length of the radially extending pads P1, P2 and/or by increasing the length of the axially extending pads P3, P4 to any desired amount. FIG. 4 thus illustrates one of the geometrical insights underlying the present invention, namely that all pads around the magnet can be located on a virtual cylindrical surface and can be connected to the four yokes in a manner in which flux leakage between them is relatively low. As already mentioned above, however, some of the pads can be omitted.

FIG. 4(d) is a copy of FIG. 4(c) but additionally shows two pairs of flux collectors, each having respective extensions together forming the first and second air gap G1, G2. Reference is also made to FIG. 5(d) showing the flux collectors C3 and C2 in top view.

As can be appreciated from FIG. 4d and FIG. 5d, the flux collector C3 is arranged in close vicinity of the yoke Y3 without physically touching it (e.g. by axial spacing). Likewise, the flux collector C4 is arranged in close vicinity of the yoke Y4, the flux collector C1 is arranged in close vicinity of the yoke Y1, and the flux collector C2 is arranged in close vicinity of the yoke Y2, without making physical contact. The flux collectors allow rotation of the yokes while the collectors may be fixed to the environment. The collectors C1-C4 may be curved or arc-shaped, or can even be circular or ring-shaped, but the latter is not required. The radial width of the collectors may be slightly larger than the radial width of the yokes, so that a projected area of the yokes (in the Z-direction) completely falls within the projected area of the collectors. This reduces any undesirable effects of mechanical mounting tolerances.

As can be appreciated from FIG. 4d, and in more detail from FIG. 4e, the first extension E1 of the first collector C1 and the second extension E2 of the second collector C2 are aligned so as to form a first gap G1, in which gap the first sensor S1 is mainly situated. Likewise, the third extension E3 of the third collector C3 and the fourth extension E4 of the fourth collector C4 are axially aligned so as to form a second gap G2, in which gap the second sensor S2 is mainly situated.

The first and second sensor S1, S2 may each be a Hall IC comprising at least one Hall element, for example at least one horizontal Hall element. Preferably the Hall plate of these Hall elements is disposed in the gap between the fingers of the flux collectors.

Preferably the opening (also referred to as "gap distance") between the extensions E1, E2 and the opening (or "gap distance") between the extensions E3, E4 is made as small as possible (e.g. equal to about 2.0 mm), but sufficiently large for the sensors to fit between them, in order to maximize the magnetic flux density to be detected.

In the examples shown, the extensions E1-E4 of the flux collectors C1-C4 are oriented mainly in the axial direction Z, but that is not absolutely required for the present invention to work, and other orientations can also be used. It is important however that the two sensors S1, S2 are oriented substantially in parallel, in order to measure substantially the same external magnetic field component (see formula [2] and [3] above).

Each sensor device may be configured for measuring only a single magnetic field component, for example Bz oriented in the axial direction Z of the sensor structure, perpendicular to the plane defined by the Hall plate.

Alternatively, each Hall IC may comprise at least two Hall plates or at least three Hall plates or at least four Hall plates, each configured for measuring a magnetic field component Bz in the axial direction. By using multiple measurements inside each gap rather than only one, the effect of offset error can be reduced (e.g. by using only the maximum value). The other measurements can advantageously be used for redundancy purposes, despite that they may be less accurate.

FIG. 4(e) shows an example of how a first and a second magnetic sensor S1, S2 may be positioned inside the first and second gap G1, G2. In this example, the two sensor devices are mounted on a single substrate, for example on a single printed circuit board PCB 410.

In the example of FIG. 4d and FIG. 4e the extensions E1-E4 are arranged at different radial distances from the central axis of the sensor structure for illustrative purposes, but that is not absolutely required, and other arrangements are also possible, as shown for example in FIG. 5(d), where said extensions and sensors (indicated by dotted squares) are spaced apart in the circumferential direction rather than the radial direction. It is explicitly pointed out in this respect that FIG. 4d and FIG. 5d are showing two different arrangements, in order to reduce the number of drawings.

In another embodiment, the extensions of the first pair of collectors and the extensions of the second pair of collectors are located on opposite sides of the magnetic structure. This is not preferred however, because the external disturbance field may not be substantially the same in this case.

FIG. 5 shows a top view of the sensor structure 100 of FIG. 1. FIG. 5(a) shows a color picture. FIG. 5(b) shows a dithered picture. FIG. 5(c) shows a line drawing. It can be appreciated from FIG. 5 that there is a small air gap between the pads and the circumference of the magnet, for allowing the magnet to rotate relative to the pads without making physical contact, when a torque is applied.

FIG. 5(d) is a copy of FIG. 5(c) but additionally shows two exemplary flux collectors C1 for the first yoke Y1, and C3 for yoke Y3. The flux collectors are already described above (when discussing FIG. 4d). As shown, the flux collectors may have a partial ring shape or arc-shape.

In alternative embodiments (not shown), the flux collectors have the same of a complete ring or circle, but that is not absolutely required.

FIG. 6 illustrate a second exemplary sensor structure 600 for measuring a torque, which can be seen as a variant of the sensor structure 100 of FIG. 1 to FIG. 5. The main differences being that the sensor structure 600 of FIG. 6 has a ring magnet with only four poles at its outer circumference (instead of twelve), and that each of the four yokes Y1-Y4 only has a single pad (instead of three).

FIG. 6(a) shows a color picture of a perspective view of a 3D model of the sensor structure. FIG. 6(b) shows a dithered picture. FIG. 6(c) shows a line drawing.

FIG. 7 illustrate a third exemplary sensor structure 700 for measuring a torque, which can be seen as another variant of the sensor structure 100 of FIG. 1. In FIG. 7, the first and second yoke Y1, Y2 and the corresponding pads and fingers are omitted for illustrative purposes. Or in other words, FIG. 7 is a variant of FIG. 3. The main differences between the sensor structure 700 of FIG. 7 and the sensor structure 100 of FIG. 1 are that the sensor structure 700 of FIG. 7 has a ring magnet with only eight poles at its outer circumference (instead of twelve), and that each of the four yokes Y1-Y4 has only two pads (instead of three).

FIG. 7(a) shows a color picture of a perspective view of a 3D model of the sensor structure. FIG. 7(b) shows a dithered picture. FIG. 7(c) shows a line drawing.

In other variants of the torque sensor structure (not shown), the sensor structure has a ring magnet with only six poles, or only ten poles, or in general having (N*4+2) poles, meaning an even number of poles but not an integer multiple of four. In these embodiments, the yokes may not have the same number of pads. For example, in the case of a sensor structure with a magnet having only six poles, some yokes may have only one pad, while other yokes may have two pads. Everything else described above is also applicable here. It is an advantage of this embodiment that also a ring magnet having 4N+2 poles at its circumference can be used.

Figure 8:
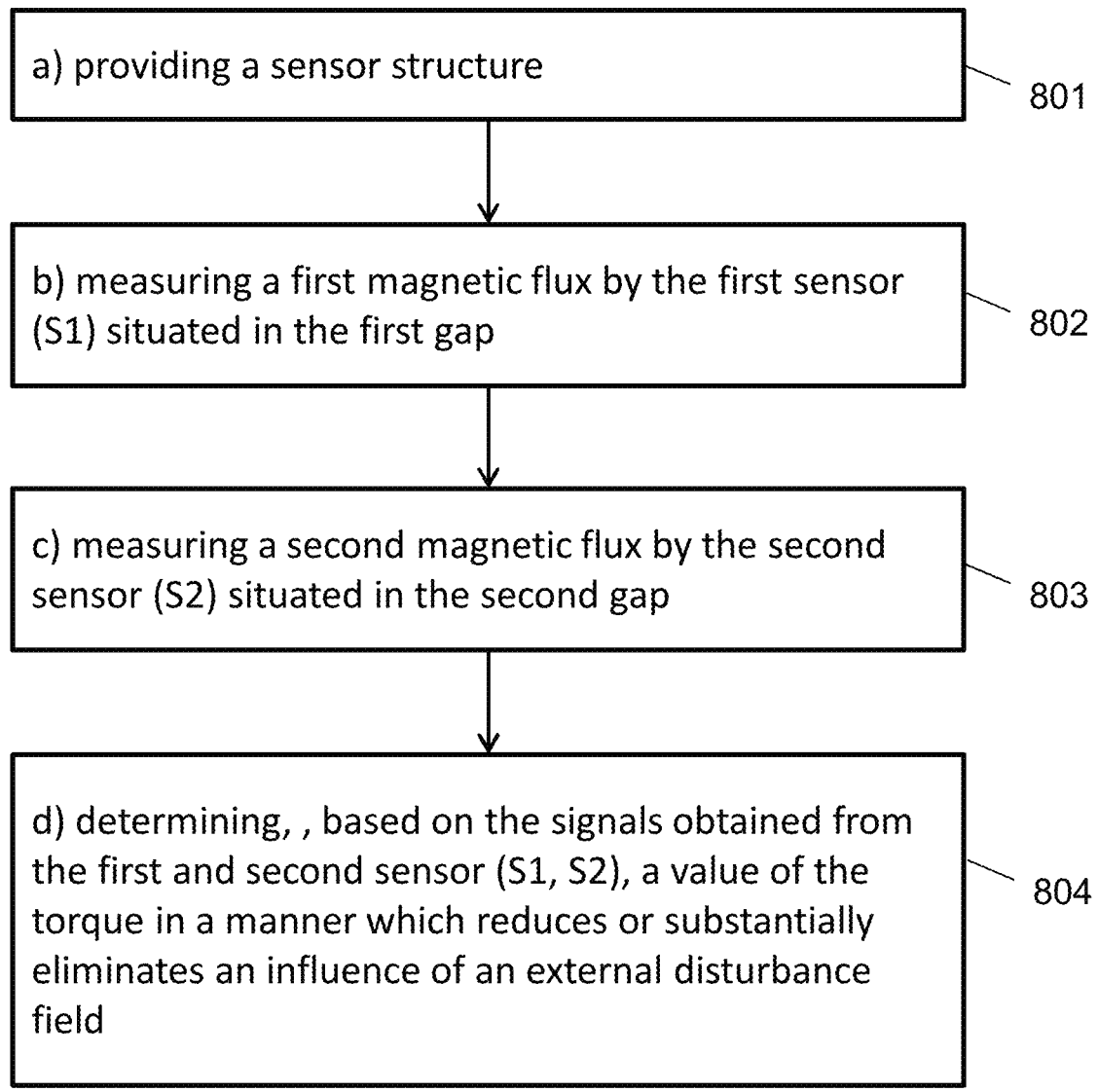
FIG. 8 shows a flow-chart of a method of measuring a torque applied to a shaft, using a sensor structure according to the present invention, for example a sensor structure as shown in FIG. 1 to FIG. 7.

FIG. 8 shows a flow-chart of a method 800 of measuring a torque applied to a first and second shaft, using a sensor structure as described above. The method 800 comprises the steps of:
  a) providing 801 a sensor structure having the characteristics described above, for example a sensor structure as shown in any of FIG. 1 to FIG. 7;
  b) measuring 802 a first magnetic flux density by the first sensor S1 situated in the first gap G1;
  c) measuring 803 a second magnetic flux density by the second sensor S2 situated in the second gap G2;
  d) determining 804, based on the signals obtained from the first and second sensor S1, S2, a value of the torque in a manner which reduces or substantially eliminates an influence of an external disturbance field.

Step d) may comprise solving the set of equations [1] to [3] described above.

The invention claimed is:

1. A sensor structure for measuring a torque between a first shaft and a second shaft interconnected by means of a torsion bar, the sensor structure comprising:
  a ring magnet mechanically connected or connectable to the first shaft, and comprising a number of North and South poles alternatingly arranged at a circumference of the ring magnet;
  a first pair of magnetic yokes mechanically connected or connectable to the second shaft, and comprising a first magnetic yoke and a second magnetic yoke, the first magnetic yoke being mechanically and magnetically coupled to one or more first pads by means of first fingers, the second magnetic yoke being mechanically and magnetically coupled to one or more second pads by means of second fingers, the first and second fingers projecting respectively from the first and second yoke in a mainly radial direction;
  a second pair of magnetic yokes mechanically connected or connectable to the second shaft, comprising a third magnetic yoke, and a fourth magnetic yoke, the third magnetic yoke being mechanically and magnetically coupled to one or more third pads by means of third fingers, the fourth magnetic yoke being mechanically and magnetically coupled to one or more fourth pads by means of fourth fingers, the third and fourth fingers projecting respectively from the third and fourth yoke in a mainly axial direction;
  a first and a second flux collector arranged in a vicinity of the first and second magnetic yoke respectively for collecting field lines of the magnetic field generated by the ring magnet and guided via the first and second magnetic yoke, and shaped so as to form a first gap between these collectors;
  a third and a fourth flux collector arranged in a vicinity of the third and fourth magnetic yoke respectively for collecting field lines of the magnetic field generated by the same ring magnet and guided via the third and fourth magnetic yoke, and shaped so as to form a second gap between these collectors;
  a first magnetic sensor located in the first gap and configured for measuring at least one magnetic field component in said first gap and for providing a first signal;
  a second magnetic sensor located in the second gap and configured for measuring at least one magnetic field component in said second gap and for providing a second signal;
  wherein the second yoke is axially located between the first and third yoke, and wherein the first yoke is axially located between the second and fourth yoke;
  wherein the pads are arranged such that, when a torque is applied, the first and third pads face a major portion of a first type of the magnetic poles of the ring magnet, and the second and fourth pads face a major portion of a second type of the magnetic poles of the same ring magnet, the second type being different from the first type;
  a processing circuit configured for determining a value of the torque based on the first and the second signal, in a manner which reduces or substantially eliminates an influence of an external disturbance field.

2. The sensor structure according to claim 1, wherein the processing circuit is configured for calculating a value indicative of the flux generated by the magnet by linearly combining the first and second signal or by solving a matrix equation, and by converting an amount of flux into a value of the torque.

3. The sensor structure according to claim 1, wherein each of the first, second, third and fourth magnetic yoke has a ring shape.

4. The sensor structure according to claim 3, wherein the first and second magnetic yoke have a first diameter; and
  wherein the third and fourth magnetic yoke have a second diameter different from the first diameter.

5. The sensor structure according to claim 1, wherein the first collector comprises a first extension and the second collector comprises a second extension shaped so as to form said first gap; and
  wherein the third collector comprises a third extension and the fourth collector comprises a fourth extension shaped so as to form said second gap.

6. The sensor structure according to claim 5, wherein the first and second extension are aligned in the axial direction; and
  wherein the third and fourth extension are aligned in axial direction.

7. The sensor structure according to claim 1, wherein the first magnetic sensor is configured for measuring a first magnetic field component in the axial direction, and the second magnetic sensor is configured for measuring a second magnetic field component in the axial direction; and
  wherein the circuit is configured for combining the first measured value indicative of the first magnetic field component and the second measured value indicative of the second magnetic field component in a manner which is highly insensitive to an external disturbance field oriented in, or having a component in the axial direction; and wherein the processing circuit is configured for calculating a value indicative of the flux generated by the magnet by linearly combining the first and second signal or by solving a matrix equation, and by converting an amount of flux into a value of the torque.

8. The sensor structure according to claim 1, wherein the first sensor is or comprises a first horizontal Hall element configured for providing said first signal; and
wherein the second sensor is or comprises a second horizontal Hall element configured for providing said second signal, and being oriented parallel with the first horizontal Hall element; and
wherein the processing circuit is configured for calculating a value indicative of the flux generated by the magnet by linearly combining the first and second signal or by solving a matrix equation, and by converting an amount of flux into a value of the torque.

9. The sensor structure according to claim 1, comprising only one ring magnet.

10. The sensor structure according to claim 1, wherein each of the first, second, third and fourth pads are located at substantially a same axial position.

11. The sensor structure according to claim 1, wherein each of the first, second, third and fourth pads are located at substantially a same radial position.

12. The sensor structure according to claim 1, wherein the first magnetic sensor and the second magnetic sensor are located on a single substrate.

13. The sensor structure according to claim 1, wherein the total number of magnetic poles at the circumference of the ring magnet is an integer multiple of four.

14. The sensor structure according to claim 1, wherein each of the magnetic poles at the circumference of the ring magnet is facing an associated pad.

15. The sensor structure according to claim 1, wherein the total number of magnetic poles at the circumference of the ring magnet is at least six.

16. The sensor structure according to claim 1, wherein the total number of magnetic poles at the circumference of the ring magnet is an integer multiple of two, but not an integer multiple of four.

17. The sensor structure according to claim 1, wherein the flux collectors have a ring shape or a partial ring shape and are arranged at a predefined axial distance from the corresponding yoke.

18. A method of measuring a torque in a manner which is less sensitive or highly insensitive to an external disturbance field, comprising the steps of:
a) providing a sensor structure, the sensor structure comprising:
a ring magnet mechanically connected or connectable to a first shaft, and comprising a number of North and South poles alternatingly arranged at a circumference of the ring magnet;
a first pair of magnetic yokes mechanically connected or connectable to a second shaft, and comprising a first magnetic yoke and a second magnetic yoke, the first magnetic yoke being mechanically and magnetically coupled to one or more first pads by means of first fingers, the second magnetic yoke being mechanically and magnetically coupled to one or more second pads by means of second fingers, the first and second fingers projecting respectively from the first and second yoke in a mainly radial direction;
a second pair of magnetic yokes mechanically connected or connectable to the second shaft, comprising a third magnetic yoke, and a fourth magnetic yoke, the third magnetic yoke being mechanically and magnetically coupled to one or more third pads by means of third fingers, the fourth magnetic yoke being mechanically and magnetically coupled to one or more fourth pads by means of fourth fingers, the third and fourth fingers projecting respectively from the third and fourth yoke in a mainly axial direction;
a first and a second flux collector arranged in a vicinity of the first and second magnetic yoke respectively for collecting field lines of the magnetic field generated by the ring magnet and guided via the first and second magnetic yoke, and shaped so as to form a first gap between these collectors;
a third and a fourth flux collector arranged in a vicinity of the third and fourth magnetic yoke respectively for collecting field lines of the magnetic field generated by the same ring magnet and guided via the third and fourth magnetic yoke, and shaped so as to form a second gap between these collectors;
a first magnetic sensor located in the first gap and configured for measuring at least one magnetic field component in said first gap and for providing a first signal;
a second magnetic sensor located in the second gap and configured for measuring at least one magnetic field component in said second gap and for providing a second signal;
wherein the second yoke is axially located between the first and third yoke, and wherein the first yoke is axially located between the second and fourth yoke;
wherein the pads are arranged such that, when a torque is applied, the first and third pads face a major portion of a first type of the magnetic poles of the ring magnet, and the second and fourth pads face a major portion of a second type of the magnetic poles of the same ring magnet, the second type being different from the first type;
a processing circuit configured for determining a value of the torque;
b) measuring a first magnetic flux by the first magnetic sensor situated in the first gap;
c) measuring a second magnetic flux by the second magnetic sensor situated in the second gap;
d) determining the value of the torque by the processing circuit in a manner which reduces or substantially eliminates an influence of an external disturbance field, based on the first signal and the second signal obtained from the first magnetic sensor and the second magnetic sensor.

19. The method according to claim 18, wherein step d) comprises calculating a value indicative of the flux generated by the magnet by linearly combining the first and second signal, or by solving a matrix equation.

20. The method according to claim 18, wherein step d) further comprises converting a calculated value of the flux into a torque value by means of a look-up table or using a mathematical expression.

* * * * *